Nov. 23, 1937.     P. R. SIMPSON     2,099,945
METHOD FOR THE TREATMENT OF COFFEE OR THE LIKE
Filed Sept. 22, 1934     2 Sheets-Sheet 1
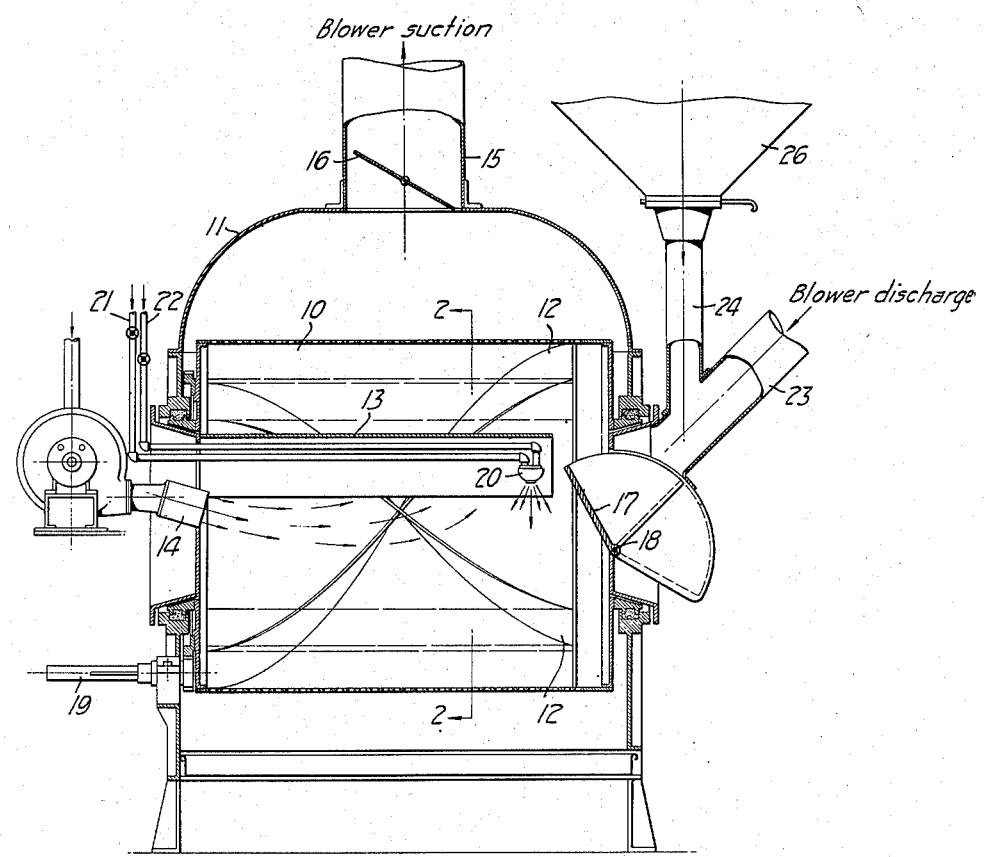
FIG_1_
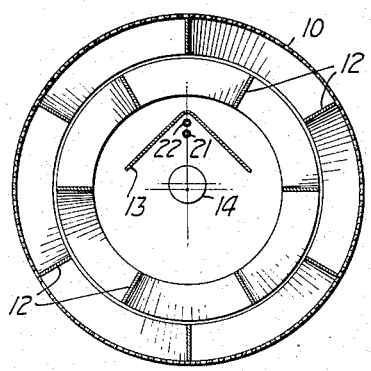
FIG_2_
INVENTOR.
Paul R. Simpson
BY
ATTORNEY.

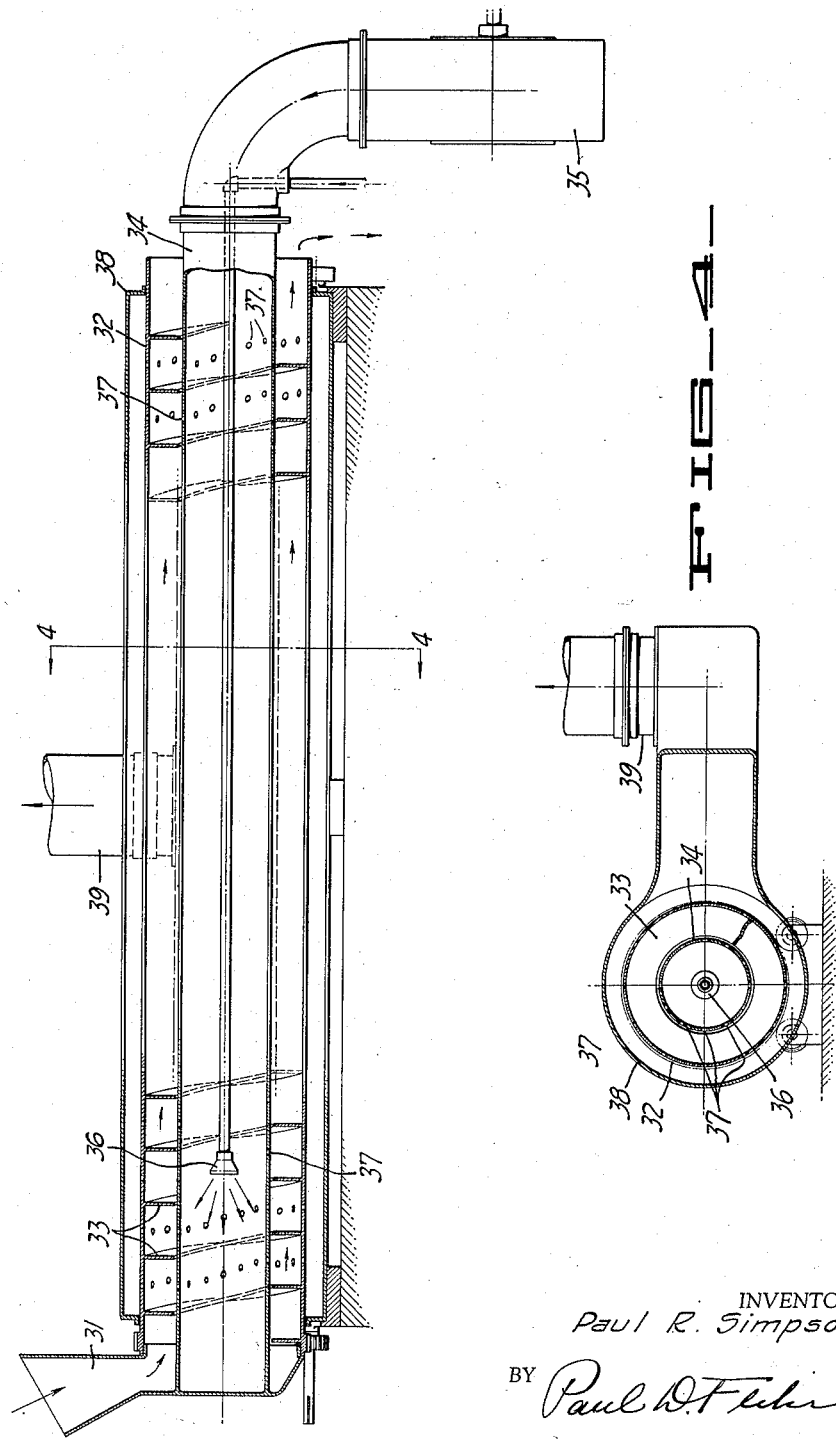

Patented Nov. 23, 1937

2,099,945

UNITED STATES PATENT OFFICE 2,099,945

METHOD FOR THE TREATMENT OF COFFEE OR THE LIKE

Paul R. Simpson, San Mateo, Calif.

Application September 22, 1934, Serial No. 745,075

4 Claims. (Cl. 34—24)

This invention relates generally to the treatment of coffee or like material to produce a roasted product.

In the roasting of coffee or like material, the characteristics of the finished product, particularly with respect to flavor and aroma, are affected by temperature and time factors and by the degree of uniformity of the treatment. Past practice in the treatment of coffee has demonstrated that it is desirable to cool the heated mass immediately following the roasting operation, which presumably minimizes loss of certain volatile aromatic and flavoring constituents. However, cooling methods proposed in the past have been subject to certain disadvantages, or have not secured results comparable to the present invention. For example, where the heated coffee has been subjected to a spray of water, the cooling effect has not been distributed uniformly throughout the mass, thus producing an inferior product. Likewise, where the heated coffee has been cooled by a draft of air, the rate of cooling has not been sufficiently rapid to secure the results desired.

It is an object of the present invention to provide a process or method for treating coffee or the like, which will afford extreme rapidity of cooling following the roasting operation, in conjunction with uniformity of the cooling effect throughout the mass, thus making possible a high quality product having predetermined characteristics with respect to flavoring and aromatic constituents.

A further object of the invention is to provide a simple form of apparatus capable of carrying out my method.

Referring to the drawings:

Fig. 1 illustrates a type of apparatus capable of being utilized in carrying out my method, the apparatus being shown in side elevation and in cross-section.

Fig. 2 is a cross-sectional detail taken along the lines 2—2 of Fig. 1.

Fig. 3 is a side elevational view, partly in cross-section, showing a continuous treatment type of apparatus utilizing the invention.

Fig. 4 is a cross-sectional detail taken along the line 4—4 of Fig. 3.

The method of the present invention is characterized by the fact that immediately following heat treatment to effect the desired degree of roasting, cooling is effected by vaporization of carbon tetrachloride, water, or other suitable vaporizable medium, while a draft of air or other non-condensable gas is being maintained through the mass to secure uniformity of the cooling effect.

This method can be better described in detail after a description of the apparatus illustrated in the drawings.

Referring to the roasting apparatus illustrated in Fig. 1, it consists of a rotatable drum 10 adapted to receive a batch of coffee or like material to be treated, and which is retained within a housing 11. In accordance with common roaster construction, the peripheral side walls of the drum are perforated to permit the passage of gas, and the interior is provided with suitable vanes or flights 12 for securing proper agitation. Extending longitudinally of the drum, and above the axis of rotation, there is a spreader 13. As representative of a source of heat for the roasting operation, I have shown a gas burner 14 arranged to propagate a flame in the space below spreader 13.

Gaseous products of combustion caused to pass through the mass being treated are shown being removed through the flue conduit 15. This conduit can be connected to the intake side of a suitable draft blower, and is shown provided with a draft regulating damper 16. A door 17, hinged at 18, is shown as representative of means for introducing a charge of material to be treated, and for effecting discharge of the roasted product. The discharge position of this door is illustrated in solid lines, while the position during the roasting operation and for charging the drum, is illustrated in dotted lines. Shaft 19 is representative of suitable drive means for continuously rotating the drum during operation of the roaster.

As thus far described, the roaster of Fig. 1 does not differ from apparatus which has been used in the past for the treatment of successive batches of coffee. However, in conjunction with such conventional apparatus, means are provided for introducing a spray of vaporizable liquid, such as carbon tetrachloride or water, together with means for establishing and maintaining a draft of non-condensable gas, such as air, through the contents of drum 10, upon termination of the supply of heat. Spray nozzle 20 is representative of suitable means for introducing the vaporizable liquid. This nozzle is shown connected to the liquid and air pipes 21 and 22, respectively, and is preferably of a type capable of producing a relatively finely comminuted or atomized spray. Conduit 23 is representative of means for establishing and maintaining a draft of air or like non-condensable gas through the contents of the drum. This conduit connects to a suitable source of air under pressure, such as the discharge side of a blower, and has its discharge end arranged to deliver a stream of air into the interior of drum 10 when the door 17 is in normal or closed position. In order that door 17 may continue to function as a charging chute, a tube 24, leading from the storage hopper 26, may communicate with the air conduit 23, near the discharge end of the latter.

The use of the apparatus described above, in the carrying out of my method, can now be described in detail. Assuming that the material to be treated is a green coffee, a suitable quantity is supplied from the hopper 26 to the drum 10, while the drum is being rotated. Upon closing the door 17, the burner 14 is ignited to commence the roasting operation. The mass of coffee being treated is heated both by hot gaseous products of combustion which pass through the charge, and by heat of radiation directly to the material streaming down from the side edges of spreader 13. Damper 16 is of course adjusted to such a position as to secure proper combustion and relatively efficient heating. By means of a suitable pyrometer or like instrument, the operator may be apprised of the varying temperatures of treatment.

After the heat treatment has proceeded to secure the desired degree of roasting, operation of burner 14 is discontinued, and immediately thereafter, while the drum is still in rotation, an atomized spray of liquid is introduced by nozzle 20, and a draft of air is established through the charge. In establishing the draft of air, damper 16 is opened and conduit 23 is operatively connected to the blower or like source of air under pressure, whereby the rate of air flow to the interior of the drum from conduit 23 is considerably in excess of the rate of flow through conduit 15. Assuming that in the roasting operation the temperature of the coffee has attained a relatively high value, say 400° F., the atomized spray of liquid issuing from nozzle 20 will immediately vaporize, thereby causing the absorption of relatively large quantities of heat. The forced draft of air serves to dilute the stream of water vapor, and carries this vapor in all directions through the heated mass of coffee. In this connection it is important to note that the absorption of heat so obtained by vaporization of water, in conjunction with the draft of air or like non-condensable gas, serves in effect to distribute the absorption of heat throughout the mass of material being treated, thereby causing substantially all parts of the mass to decrease rapidly in temperature at substantially the same rate. This is by virtue of the distribution of vapor through the continually agitated mass of coffee by the draft of air, and by virtue of the fact that any small particles of liquid which are not immediately vaporized are well distributed to contact various points of the mass, instead of contacting the coffee beans at localized regions. The net result is that substantially all of the coffee beans are relatively uniformly cooled at a rapid rate, so that the benefits of the rapid cooling are imparted to the entire mass.

The initial rapid fall in temperature from the peak of the roasting heat is deemed most beneficial to the final product. Assuming the maximum roasting temperature to be in the neighborhood of 400° F., after the temperature has dropped to any desired point, such as 300° or 350° F., further rapid cooling may be discontinued and the coffee discharged for further cooling in contact with air, or the rate of introduction of liquid may be reduced without discontinuing the air draft. In practice, a drop from 400° to 350° F. can take place within a relatively short time of 10 seconds or less. When using a liquid having a relatively low vaporization point, such as carbon tetrachloride, the introduction of the liquid may be continued until the coffee has been cooled to, say, 200° F. When using water, the operator usually discontinues introduction of the liquid at a somewhat higher temperature level, to avoid a possible undue increase in moisture content.

The draft of air maintained through the mass during the cooling operation should not be confused with the draft maintained during the roasting operation. By comparison, the latter draft is at a relatively slow rate (due to the partially closed position of damper 16 and the absence of pressure within the drum) and it would not of itself effect the desired results during the cooling operation. The draft which I employ is usually at atmospheric temperature and flows through the charge at a relatively high rate. The blowing in of air under pressure in the present process is deemed of more importance than suction applied to conduit 10, since it causes the air to be forced more effectively through all parts of the charge, with a considerable part of the air escaping from the lower and other parts of housing 11.

It is evident that my method is far superior to methods which have previously been utilized in the past. If it were attempted to carry out the cooling operation merely by introducing a vaporizable liquid without the accompanying draft of air, there would be no proper distribution of the cooling action throughout the mass of material, and the resulting product would lack uniformity with respect to desired characteristics, such as imparted by volatile aromatic and flavoring constituents. If it were attempted to secure cooling only by the use of a draft of air, the drop in temperature would not occur with sufficient rapidity to secure the results desired. By utilizing the introduction of vaporizable liquid in conjunction with the draft of air, rapid cooling is obtained without sacrifice of uniformity, thus making possible a high quality finished product.

Where water is employed, the spray may be formed by wet steam in place of directly atomizing liquid. More favorable results have been secured by the use of carbon tetrachloride than water since such a medium is inert and has no tendency to affect the moisture content of the finished product, even though introduction of such liquid is continued to cool the coffee to a relatively low temperature of say 200° F. Water has the advantage of cheapness. Air is of course a convenient non-condensable gas for maintaining a draft during the cooling operation, although other relatively inert gases may be utilized where available.

No particular recommendations have been made with respect to the temperature and time period for the roasting operation, because these factors may be varied with different operators in accordance with the character of material being treated and in accordance with the type of roast desired. In general, it is desirable that the roasting period be not unduly prolonged, as such treatment may cause an excessive loss of desired volatile constituents.

It will be evident that utilization of my invention is not confined to the specific form of apparatus illustrated in the drawing. For example, the atomized spray of liquid can be introduced in conduit 23 to be carried by the air stream into the interior of drum 10, instead of the arrangement illustrated which locates the nozzle 20 below the spreader. In both instances the liquid will be introduced into the stream of air prior to flow of the same through the main mass of the charge, although in the arrangement shown air passes through a certain amount of the coffee streaming down the end of the drum before entering the space below the spreader.

In Figs. 3 and 4 I have shown a continuous type of apparatus to which the invention may be applied when coffee is being roasted continuously. The hot coffee coming directly from the continuous roasting equipment is delivered by conveying means 31 to a perforated rotatable drum 32. This drum is equipped with helicoidal vanes 33, to continuously progress the coffee longitudinally of the same to the discharge end. An air conduit 34 extends axially through the drum, and is connected to a source of air under pressure, such as a blower 35. Positioned in conduit 34, preferably near the entrant end of the drum, there is a nozzle 36 for introducing an atomized liquid such as carbon tetrachloride or water, which is carried into the drum by air discharging from openings 37. The drum may be enclosed by a housing 38, connected to the suction side of a blower by conduit 39.

It is apparent that the apparatus of Figs. 3 and 4 will operate continuously to initially rapidly cool the coffee received from the roasting operation, after which the coffee is more gradually cooled before its discharge.

While the invention has been found to be of particular value in the treatment of coffee, it can be applied to other materials where similar problems are encountered, as for example in the roasting of peanuts or cocoa.

I claim:

1. In a method for the continuous treatment of coffee or like material, continuously progressing the material from a roasting zone through a cooling zone, flowing a forced draft of non-condensable gas through the material in the cooling zone, and simultaneously supplying a vaporizable liquid in atomized condition to the cooling zone and vaporizing said liquid in the presence of heat from the material.

2. In a method for the treatment of coffee or like material, where a charge of coffee is treated within a rotatable drum having foraminous side walls and which in turn is disposed within a housing, the steps of applying heat to the interior of the drum while the drum is being rotated, continuously exhausting gases from the housing during such heating, interrupting the supply of heat when roasting of the coffee is completed, and then immediately thereafter effecting rapid cooling of the charge by increasing the rate of exhaust of gases from the housing, and by simultaneously blowing cool non-condensable gas into the interior of the drum in excess of the rate with which gases are being exhausted from the housing, and atomizing a vaporizable liquid into the cool gas.

3. In a method for the treatment of coffee or like material, roasting the material, uniformly cooling the mass of material immediately after roasting by flowing a forced draft of non-condensable gas through the roasted material while simultaneously injecting into the roasted material a vaporizable liquid in atomized condition and vaporizing said liquid in the presence of heat from the roasted material.

4. In a method of cooling coffee or like material after roasting, the improvement which comprises injecting into the material an atomized cooling liquid and simultaneously injecting into the material a volume of non-condensable gas in excess of the quantity required to atomize the liquid, said gas being injected under pressure and at a velocity greater than the normal circulation of air whereby to distribute the liquid or its vapor uniformly throughout the mass of material.

PAUL R. SIMPSON.